United States Patent [19]
Hansson

[11] 3,711,628
[45] Jan. 16, 1973

[54] SLEEVE JOINT FOR ALUMINUM SHEATHED CABLE

[75] Inventor: Hans Olof Hansson, Sollentuna, Sweden

[73] Assignee: Telefonaktiebolaget LM Ericsson, Stockholm, Sweden

[22] Filed: Feb. 3, 1971

[21] Appl. No.: 112,117

[30] Foreign Application Priority Data

Feb. 25, 1970 Sweden ............................ 2409/70

[52] U.S. Cl. .................. 174/71 R, 29/502, 29/504, 75/166 C, 174/84 R, 285/287
[51] Int. Cl. ............................................. H02g 15/18
[58] Field of Search ....... 174/21 R, 68 R, 71 R, 72 R, 174/84 R, 94 R; 29/484, 497, 500, 501, 502, 504; 75/166 R, 166 B, 166 C, 166 D; 285/287; 339/275 C, 278 C

[56] References Cited

UNITED STATES PATENTS

| | | | |
|---|---|---|---|
| 490,840 | 1/1893 | Wegner | 75/166 D |
| 900,846 | 10/1908 | Goodson | 75/166 R X |
| 2,196,855 | 4/1940 | Dietloff | 75/166 C X |

FOREIGN PATENTS OR APPLICATIONS

| | | | |
|---|---|---|---|
| 236,747 | 7/1925 | Great Britain | 75/166 C |
| 614,477 | 12/1948 | Great Britain | 174/21 R |

OTHER PUBLICATIONS

Electrical Review, "Jointing Aluminum Cable," Jan. 28, 1949, page 135.

Primary Examiner—Laramie E. Askin
Attorney—Hane, Baxley & Spiecens

[57] ABSTRACT

A sleeve joint for aluminum sheathed cable, particularly when jointing signal telephone and power cables, comprises an aluminum tube whose interior diameter is somewhat larger than the exterior diameter of the aluminum sheathed cable. Both ends of the tube are provided with slots forming a number of tongues which are deformable so that their extremities can be bent down to bear against the sheathed cable. The tongues and the continuous part of the tube are coated on their inside as well as their outside surfaces with a wiping solder consisting of lead, tin, zinc and antimony in special proportions.

6 Claims, 4 Drawing Figures

PATENTED JAN 16 1973
3,711,628
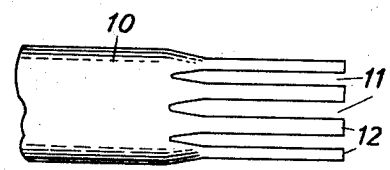
Fig.1
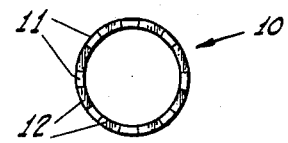
Fig.2
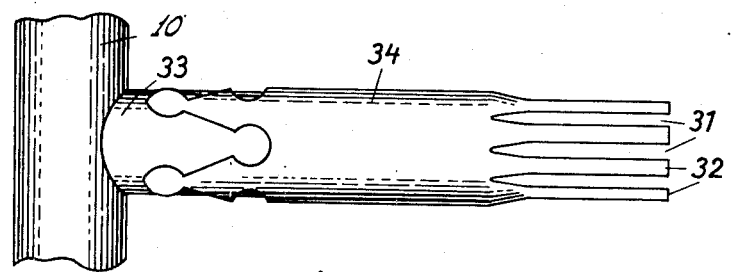
Fig.3
Fig.4
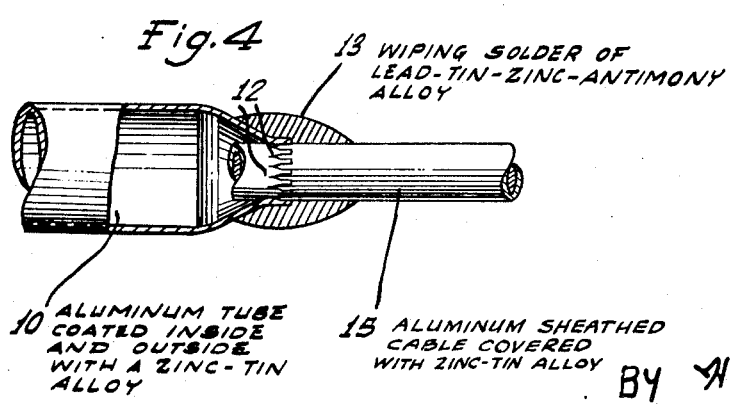
13 WIPING SOLDER OF LEAD-TIN-ZINC-ANTIMONY ALLOY
10 ALUMINUM TUBE COATED INSIDE AND OUTSIDE WITH A ZINC-TIN ALLOY
15 ALUMINUM SHEATHED CABLE COVERED WITH ZINC-TIN ALLOY
INVENTOR.
HANS OLOF HANSSON
BY Hane, Baxley and
Spiecens
ATTORNEYS

SLEEVE JOINT FOR ALUMINUM SHEATHED CABLE

The present invention relates to a sleeve joint for aluminum sheathed cable.

A sleeve joint according to the invention is very suitable for use when joining or connecting signal, telephone and power cables.

When joining lead sheathed cable, a tube of lead is used as a sleeve joint through which the joined cables are drawn. The ends of the tube can easily be bent down towards the cable sheath because of the softness of the lead. Then the joints between the tube and the cable sheath are sealed with wiping solder.

The heavy and expensive lead sheathed cable is nowadays often replaced by aluminum sheathed cable.

The aluminum sheathed cable is comparatively stiff and if such a cable is joined with a sleeve joint of lead, a proportionately soft joint is achieved which can easily be damaged. In order to eliminate this drawback an iron tube is often placed outside the lead sleeve joint as a stiffener.

Because of corrosion the method of using a sleeve joint of lead with aluminum sheathed cables has serious drawbacks. The aluminum sheath which is often very thin is affected instead of the comparatively thick sleeve or the thick layer of wiping solder. The iron tube, in certain cases placed outside the sleeve joint, complicates and aggravates the corrosion still further. A sleeve made in this way furthermore becomes very heavy and clumsy.

An object of the invention is to eliminate the drawbacks mentioned above.

The invention will be described in greater detail by means of the accompanying drawing wherein FIG. 1 is an example showing a part of the aluminum tube included in the sleeve joint. FIG. 2 shows an end view of the tube, and FIG. 3 shows an example of a branch joint where sleeve joints according to the invention are used, FIG. 4 is a view similar to FIG. 1 but showing an aluminum sheathed cable inserted into and soldered to the aluminum tube.

The sleeve joint comprises an aluminum tube. One end of this tube is shown in FIGS. 1 and 4 has the reference numeral 10. The tube 10 has an interior diameter which is somewhat larger than the exterior diameter of the sheathed cable 15. Furthermore, both ends of the tube are provided with slots 11 which, according to the example, at their outer part closest to the end of the tube have parallel sides and the inner part of which are tapered. The tongues 12 formed between the slots are deformable so that their outer parts with parallel sides can be bent down and bear against the sheathed cable.

FIG. 2 shows the aluminum tube 10 from one end. In this example there are eight slots 11 equally distributed around the circumference of the tube to define eight tongues 12.

The tongues 12 and the continuous base part of the tube are coated both inside and out with an eutectic zinc-tin alloy having the proportions 12 percent zinc and 88 percent tin. This coating is suitably applied by so-called brushing whereby the layer of oxide is brushed away simultaneously as the coating is applied.

The plated aluminum tube is suitably pre-manufactured and, at joining, only a section of the aluminum sheathed cable on both sides of the joint needs external plating in the way described above.

In order to protect the joint, the slotted aluminum tube must be sealed against the sheathed cable at the ends. This is done with a tin solder 13 (see FIG. 4) which suitably is a so-called wiping solder consisting of 4 – 6 percent zinc, 0 – 0.5 percent antimony and the remainder lead and tin in the proportions 2:1. The most suitable solder consists of the same proportions of lead and tin as mentioned above and 4.5 – 5.5 percent zinc and 0.4 – 0.5 percent antimony.

Wiping solder consisting of only tin and lead is less suitable for use with aluminum because the corrosion attack is directed to aluminum which results in the destruction of the often very thin aluminum sheath. Furthermore aluminum corrodes very quickly. By adding 4 – 6 percent zinc, a wiping solder is obtained which is very close to aluminum in the electromotive force series.

However, when zinc is added to wiping solder, the wiping properties are impaired. By adding antimony these properties are improved.

FIG. 3 shows a detail of a branch joint intended for connecting three cables. An aluminum tube according to FIG. 1 is denoted by reference numeral 10. On this tube a branch pipe 33 is welded about an opening made in the tube 10. The branch pipe 33 which is also aluminum is so short that the conductors of the two cables which are to be jointed by means of the tube 10 can be drawn through the branch pipe 33 for comfortable jointing to each other and to the third cable. This third cable is jointed by means of another aluminum tube 34. This additional tube 34 is intended to be pushed outside the branch pipe with one of its ends. This end of the additional tube 34 is suitably provided with slots. Thus the joint becomes longer and more durable when it is covered with a wiping solder according to the invention.

The additional tube 34 is provided with slots 31 and tongues 32 in the other end as described in connection with the tube in FIG. 1. The branch pipe 33 is on the outside and the ends of the additional tube 34 are on the outside and inside coated as described in connection with FIG. 1.

A sleeve joint with a branch pipe can have many different designs. In FIG. 3 a T-joint is shown but another suitable design is a Y-joint where the branch pipe, for example, forms the upright of the Y.

A sleeve joint according to the invention can be used for joining cables with plain as well as grooved or other shaped aluminum sheaths.

I claim:

1. A sleeve joint comprising at least two aluminum sheathed cables covered with a layer of zinc-tin alloy a tube of aluminum with an inner diameter which is larger than the outer diameter of the cables so that the cables fit within said tube, each end of said tube having a plurality of axially extending tongues, adjacent ones of said tongues being spaced from each other and having sufficient length so that the extremeties of said of can be bent down to bear flush against the sheaths of the cables, a layer of zinc-tin alloy on both the inner and outer surfaces of said tube, and a layer of wiping solder on said tongues and the sheaths encompassed by said tongues.

2. The sleeve joint of claim 1 wherein said wiping solder consists of 4 to 6 percent zinc, 0.1 to 0.5 percent antimony and the remainder lead and tin in the proportions of two-to-one.

3. The sleeve joint of claim 1 wherein said wiping solder consists of 4.5 to 5.5 percent zinc, 0.4 to 0.5 percent antimony and the remainder lead and tin in the proportions of two-to-one.

4. The sleeve joint of claim 1 wherein the wall of said tube is provided with an opening in the region axially intermediate of said tongues at both ends and further comprising a branch pipe of aluminum fixed to the periphery of said opening, a further tube of aluminum fitted on said branch pipe, the end of said further tube remote from said branch pipe having a plurality of axially extending tongues, a layer of zinc-tin alloy on the outer surface of said branch pipe and on the outer and inner surfaces of the ends of said further tube, another aluminum sheathed cable covered with a layer of zinc-tin alloy within said further tube and a layer of wiping solder on the tongues of said further tube and the sheaths encompassed by said tongues.

5. The sleeve joint of claim 4 wherein said wiping solder consists of 4 to 6 percent zinc, 0.1 to 0.5 percent antimony and the remainder lead and tin in the proportions of two-to-one.

6. The sleeve joint of claim 4 wherein said wiping solder consists of 4.5 to 5.5 percent zinc, 0.4 to 0.5 percent antimony and the remainder lead and tin in the proportions of two-to-one.

* * * * *